(12) United States Patent
Akemakou

(10) Patent No.: US 6,847,143 B1
(45) Date of Patent: Jan. 25, 2005

(54) ROTARY ELECTRICAL MACHINE HAVING MAGNET ARRANGEMENTS WITH MAGNETS OF DIFFERENT COMPOSITIONS

(75) Inventor: Dokou Antoine Akemakou, Vitry-sur-Seine (FR)

(73) Assignee: Valeo Equipements Electriques Moteur, Creteil (FR)

(*) Notice: Subject to any disclaimer, the term of this patent is extended or adjusted under 35 U.S.C. 154(b) by 0 days.

(21) Appl. No.: 09/700,877
(22) PCT Filed: Mar. 17, 2000
(86) PCT No.: PCT/FR00/00650
§ 371 (c)(1),
(2), (4) Date: Nov. 20, 2000
(87) PCT Pub. No.: WO00/57534
PCT Pub. Date: Sep. 28, 2000

(30) Foreign Application Priority Data

Mar. 22, 1999 (FR) .......................... 99 03519

(51) Int. Cl.[7] .......................... H02K 21/14; H02K 21/12
(52) U.S. Cl. .......................... 310/156.43; 310/156.56; 310/154.38
(58) Field of Search .................. 310/156.37–156.47, 310/156.56, 156.53, 154

(56) References Cited

U.S. PATENT DOCUMENTS

| | | | | |
|---|---|---|---|---|
| 4,023,057 A | * | 5/1977 | Meckling | 310/154 |
| 4,139,790 A | * | 2/1979 | Steen | 310/156 |
| 4,327,302 A | * | 4/1982 | Hershberger | 310/156.56 |
| 4,358,697 A | * | 11/1982 | Liu et al. | 310/156 |
| 4,405,873 A | * | 9/1983 | Nondahl | 310/156 |
| 4,486,679 A | * | 12/1984 | Jones | 310/218 |
| 4,687,608 A | * | 8/1987 | Eino | 264/62 |
| 4,727,273 A | * | 2/1988 | Tanaka | 310/154 |
| 5,015,902 A | * | 5/1991 | Leitgeb | 310/156 |

(List continued on next page.)

FOREIGN PATENT DOCUMENTS

| | | | | | |
|---|---|---|---|---|---|
| JP | 57-097357 | * | 6/1982 | | |
| JP | 58-063059 | * | 4/1983 | | |
| JP | 58063059 A | * | 4/1983 | .......... | H02K/21/00 |
| JP | 09-205745 | * | 8/1997 | | |
| JP | 2000-228838 | * | 8/2000 | | |

OTHER PUBLICATIONS

Patent Abstract Of Japan, Pub. No. 57097357, Pub. Date Jun. 17, 1982.
Patent Abstract Of Japan, Pub. No. 09205745, Pub. Date Aug. 5, 1997.

Primary Examiner—Karl Tamai
Assistant Examiner—Pedro J. Cuevas
(74) Attorney, Agent, or Firm—Liniak, Berenato & White

(57) ABSTRACT

A rotary electrical machine, especially an alternator or an alternator-starter for a motor vehicle, comprises a stator (S), a rotor (R) and permanent magnets incorporated in the rotor and/or the stator, in which the said magnets are formed into at least two groups each of which is defined by a specific type of composition, with each sub-assembly being a combination of a magnet containing rare earths with a ferrite magnet, at least one of the magnets being arranged radially so as to generate an orthoradial magnetic flux.

12 Claims, 4 Drawing Sheets

U.S. PATENT DOCUMENTS

| | | | | |
|---|---|---|---|---|
| 5,159,220 A | * | 10/1992 | Kliman | 310/156 |
| 5,218,251 A | * | 6/1993 | Allwine, Jr. | 310/49 R |
| 5,313,159 A | * | 5/1994 | Allwine, Jr. | 324/207.2 |
| 5,684,352 A | * | 11/1997 | Mita et al. | 310/156 |
| 5,753,989 A | * | 5/1998 | Syverson et al. | 310/114 |
| 5,811,904 A | * | 9/1998 | Tajima et al. | 310/156 |
| 5,825,116 A | * | 10/1998 | Ishikawa | 310/263 |
| 5,861,695 A | * | 1/1999 | Brassard | 310/154 |
| 5,864,191 A | * | 1/1999 | Nagate et al. | 310/156 |
| 5,907,205 A | * | 5/1999 | Herman et al. | 310/152 |
| 6,008,559 A | * | 12/1999 | Asano et al. | 310/156 |
| 6,019,859 A | * | 2/2000 | Kanekiyo et al. | 148/302 |
| 6,025,667 A | * | 2/2000 | Narita et al. | 310/156.53 |
| 6,031,311 A | * | 2/2000 | Lee | 310/156 |
| 6,087,751 A | * | 7/2000 | Sakai | 310/156 |
| 6,087,752 A | * | 7/2000 | Kim et al. | 310/156 |
| 6,147,428 A | * | 11/2000 | Takezawa et al. | 310/156.57 |
| 6,177,745 B1 | * | 1/2001 | Narita et al. | 310/156.53 |
| 6,329,734 B1 | * | 12/2001 | Takahashi et al. | 310/156.56 |
| 6,340,857 B2 | * | 1/2002 | Nishiyama et al. | 310/156.53 |
| 6,342,745 B1 | * | 1/2002 | Sakai et al. | 310/156.56 |
| 6,396,181 B1 | * | 5/2002 | Akemakou | 310/156.38 |
| 6,421,519 B1 | * | 7/2002 | Yamashita et al. | 399/277 |
| 6,664,688 B2 | * | 12/2003 | Naito et al. | 310/156.01 |

* cited by examiner

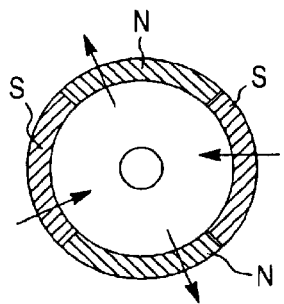
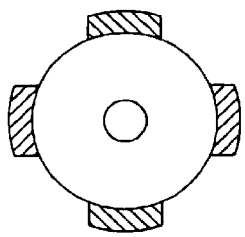
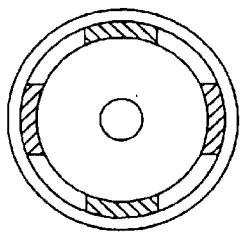
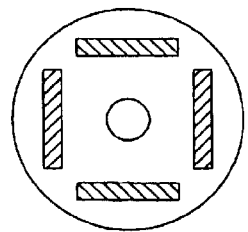
Fig. 1a
Prior Art
Fig. 1b
Prior Art
Fig. 1c
Prior Art
Fig. 1d
Prior Art
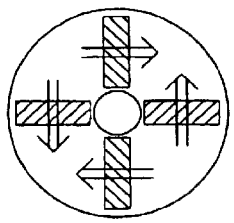
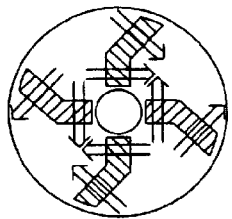
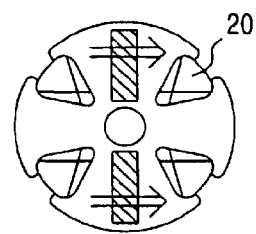
Fig. 2a
Prior Art
Fig. 2b
Prior Art
Fig. 2c
Prior Art
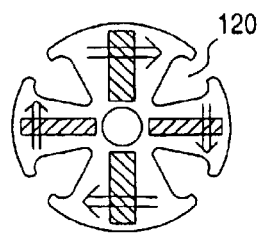
Fig. 3
Prior Art

ROTARY ELECTRICAL MACHINE HAVING MAGNET ARRANGEMENTS WITH MAGNETS OF DIFFERENT COMPOSITIONS

BACKGROUND OF THE INVENTION

1. Field of the Invention

The present invention relates in general terms to rotary electrical machines.

More precisely, the invention relates to rotary machines which incorporate permanent magnets integrated into the rotor or stator of the machine.

2. Description of Related Art

Numerous embodiments of such machines exist.

In these known forms of construction, the magnets are generally made exclusively of ferrite, or they all contain rare earths.

Each of these two types of magnets has certain specific advantages:

for equal performance, the magnets that contain rare earths are more compact, which enables the machines to be accommodated in a smaller space, on the other hand, ferrite magnets lead to greater bulk. However, the cost of these magnets is substantially less than that of the magnets that contain rare earths, the use of which raises the selling price of the machine.

According to the requirements and objectives as to size and cost linked to the design of a rotary machine, either ferrite magnets or magnets containing rare earths will therefore be selected for incorporation in the machine.

In the document JP-A-57 097 357 a rotary machine was disclosed which combined the advantages quoted above in connection with the two respective types of magnets currently used in rotary machines.

In that document, N (north) and S (south) magnets are disposed alternately around the axis of rotation of the rotor of the electrical machine. These N and S magnets are surface mounted, and produce a flux which is essentially radial as in FIGS. 1a, 1b, 1c, 1d.

It can be desirable to optimise this combination even more, in particular so as to obtain a further reduction in costs.

SUMMARY OF THE INVENTION

With this object in view, the invention proposes a rotary electrical machine, especially an alternator or an alternator-starter for a motor vehicle, comprising a stator, a rotor, an airgap between the stator and the rotor, and permanent magnets incorporated in the rotor and/or in the stator, wherein the magnets constitute at least two groups each of which is defined by a specific type of composition, namely a first group of magnets containing rare earths and a second group consisting of ferrite magnets, characterised in that a plurality of sub-assemblies is provided, each sub-assembly combining a magnet of the first group with at least one magnet of the second group, at least one of the magnets being disposed radially so as to generate an orthoradial magnetic flux.

The term orthoradial is to be understood here to mean that the flux generated by the permanent magnet concerned is at right angles to a radial direction.

Thanks to the invention, an increased concentration of magnetic fluxes is obtained, which enables the volume of the rare earth magnets, and therefore costs, to be reduced even more, while increasing the performance of the machine.

Preferred but not limiting aspects of the rotary electrical machine according to the invention are as follows:

in order to generate a magnetic flux in a generally orthoradial direction, each sub-assembly comprises a magnet containing rare earths, surrounded by two ferrite magnets;

a plurality of sub-assemblies of magnets are provided inside the rotor, each sub-assembly combining at least one magnet of the first group with at least one magnet of the second group;

each sub-assembly comprises a magnet containing rare earths situated close to the airgap, arranged in superimposed relationship in a generally radial direction with a ferrite magnet;

each sub-assembly comprises a magnet containing rare earths situated close to the airgap and in superimposed relationship in a generally radial direction with a ferrite magnet of the same thickness as the rare earth magnet, the said ferrite magnet including indexing means, in particular a chamfered portion or a notch.

BRIEF DESCRIPTION OF THE DRAWINGS

Further aspects, objects and advantages of the invention will appear more clearly on a reading of the following detailed description of preferred embodiments of the invention, which is given with reference to the attached drawings, in which:

FIGS. 1a to 1d are four diagrammatic representations of a known first way of locating magnets in a rotary machine, FIGS. 2a to 2c are three diagrammatic representations of a known second way of locating magnets in a rotary machine, FIG. 3 is a diagrammatic representation of a variant of the known second way of locating magnets in a rotary machine.

DETAILED DESCRIPTION OF THE PREFERRED EMBODIMENTS

Figure 4A:
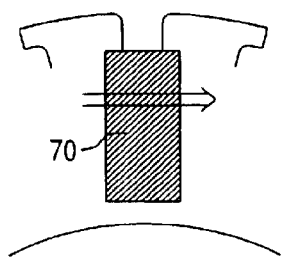
FIGS. 4a to 4c are three diagrammatic representations shown, respectively, a known way (FIG. 4a) of locating a surface magnet with orthoradial flux, and two other versions (FIGS. 4b and 4c) of the first way of locating magnets in a rotary machine according to the invention, generating a substantially equivalent orthoradial flux.

With reference to FIGS. 1a to 3, the three principal known ways of locating magnets in a rotary electrical machine will now be briefly described. In the examples given below, the magnets are integrated into the rotor of the machine; however, it is also possible to make use of known ways of fitting magnets by incorporating magnets in the stator of the machine.

FIGS. 1a to 1d show four configurations in which the North magnet N and South magnet S are disposed alternately around the axis of rotation of the rotor. In a first type of configuration, the magnets produce an essentially radial flux. In FIGS. 1a and 1b, the North magnet N and South magnet S are surface magnets, while in the configurations in FIGS. 1c and 1d they are inset.

As to FIGS. 2a and 2b, these show three configurations which give an essentially orthoradial magnetic flux. It will be noted that in the embodiment in FIG. 2c, the rotor is provided with excitation windings 20 which are fed via brushes (not shown).

Finally, it is possible to omit the windings 20 of FIG. 2c, and, as described in the document FR 98 13119 filed on 20 Oct. 1998, to arrange the magnets radially in such a way as to give rise to magnetic fluxes which are all in the same direction, for example the clockwise direction, the magnets being arranged alternately with cavities which are impermeable to magnetic flux.

FIGS. 2a to 3 show, by means of arrows, the directions of the magnetic fluxes.

There is of course a potentially limitless number of configurations for the magnets, derived from the main ways of locating them described above.

As has been said, existing machines make use either of ferrite magnets, or of magnets which contain rare earths. In order to enable rotary machines to be made which have at the same time a selling price lower than that of machines which make use exclusively of magnets containing rare earths, and which are of a size which is smaller than that of machines with ferrite magnets, an essential characteristic of the invention consists in incorporating in a rotary machine a suitable combination of magnets of different compositions (ferrite and rare earths).

Such a combination must enable the cost and performance considerations to be reconciled to the best advantage.

It is also a major aspect of the invention that such a combination of magnets of different compositions is not substantially detrimental to the performance of the machine in terms of magnetic noise, due to the creation of "magnetic imbalances". Accordingly, it will be seen later herein that the preferred combinations in accordance with the invention protect the machine from excessive magnetic noise by virtue of careful distribution of the magnets about the axis of rotation of the rotor.

In the remainder of this text, generally preferred solutions will be described in which magnets of different compositions are efficiently combined. In the interests of clarity, FIGS. 4a to 7 show magnets of the ferrite type hatched, whereas those magnets that include rare earths are shown blank.

A first general solution according to the invention consists in replacing each magnet individually by a suitable combination of a plurality of magnets of different compositions.

The rotary electrical machine includes, in the known way, a rotor R, a stator S (FIG. 5) and an airgap E between the rotor and the stator. The rotor is carried by a shaft which defines the axis of the rotor.

Figure 4B:
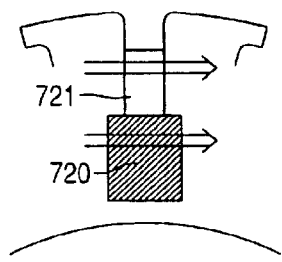
Figure 4C:
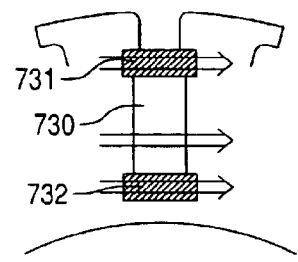

More precisely, it is possible in accordance with the invention to replace a ferrite magnet 70 inset within the rotor and contributing to the production of an orthoradial flux, that is to say a flux which is at right angles to a radial direction, such as is shown in FIG. 4a by:

an inset ferrite magnet 720 situated close to the shaft of the rotor and arranged in radially superimposed relationship with (radially inside) a second magnet 721 which contains rare earths, and which is located close to the airgap and therefore to the outer surface of the rotor, so that a magnetic flux is efficiently set up with the stator. This type of superimposed relationship is shown in FIG. 4b, the two magnets being magnetised orthoradially, or again, by a superimposed arrangement, again in the radial direction, in which a magnet 730 containing rear earths is surrounded by or interposed between two ferrite magnets 731 and 732 as shown in FIG. 4c, the three magnets here again being magnetised orthoradially.

In another version and with reference to FIG. 2b, the magnet in the second group may be located radially so as to generate an orthoradial magnetic flux, while the magnet in the first group is inclined with respect to a radial direction and constitutes an outward radial extension of the magnet in the second group. The magnets in FIG. 2b are replaced by the sub-assemblies according to the invention.

In all cases, a plurality of sub-assemblies of permanent magnets is formed, with each sub-assembly combining a permanent magnet of a first group (i.e. those with rare earths) with at least one permanent magnet of the second group (i.e. the ferrite magnets). At least one of the said magnets is oriented radially in order to generate an orthoradial magnetic flux. Magnetisation of the said magnet is therefore orthoradial as shown by the arrows.

Figure 5:
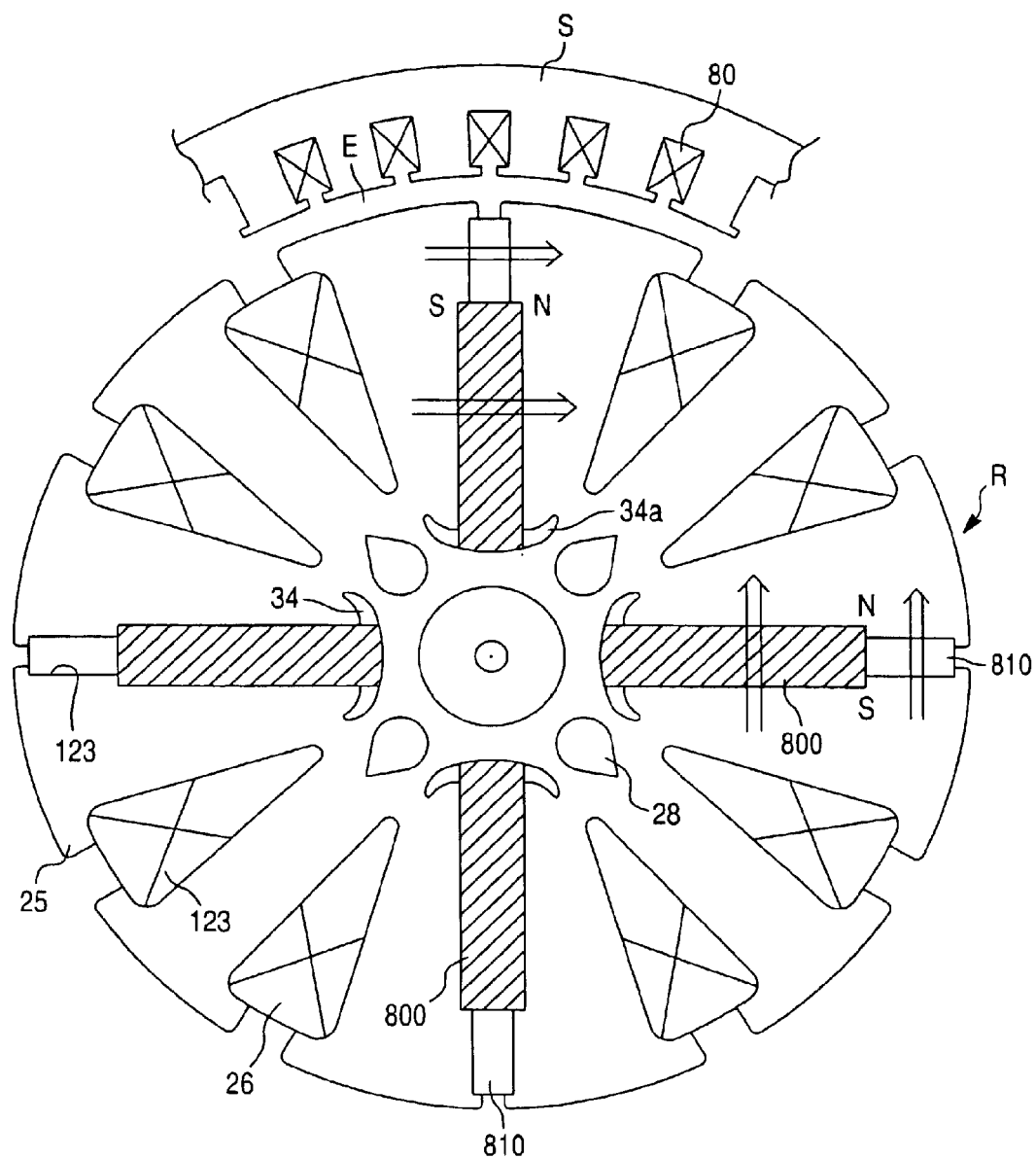
FIG. 5 is a diagrammatic representation of part of a rotary machine according to the invention, which incorporates magnets which are fitted in accordance with a first embodiment of the invention.

FIG. 5 shows one embodiment of the invention in a hybrid machine, with double excitation by windings and magnets, of the same type as that described in the document FR 99 02345.

The stator S of this machine is of a type known per se; in this example the stator is a three-phase stator in which the windings 80 are wound around the teeth of the stator, being mounted within the grooves which separates the teeth from each other. The rotor R in this example has four combinations of inset magnets corresponding to the representation in FIG. 4b: in each of these combinations, a ferrite magnet 800 situated close to the axis of rotation X is superimposed in a radial direction with a second magnet 810 that contains rare earths and is situated close to the airgap of the machine. The machine shown in FIG. 5 thus has better magnetic performance than a machine with orthoradial flux which has only ferrite magnets, and its cost is substantially smaller then that of a machine which makes use only of magnets with rare earths.

Figure 6A:
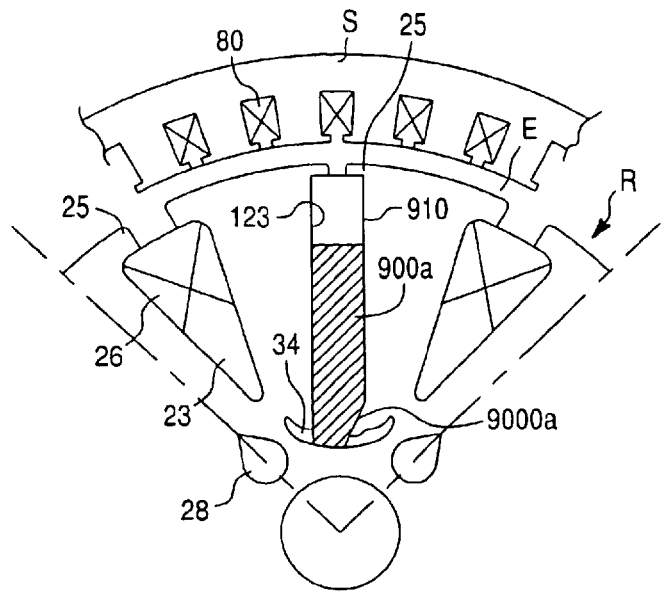
FIGS. 6a and 6b are two detail views showing, respectively, two further versions of the configuration of the magnets in a machine similar to that in FIG. 5.
Figure 6B:
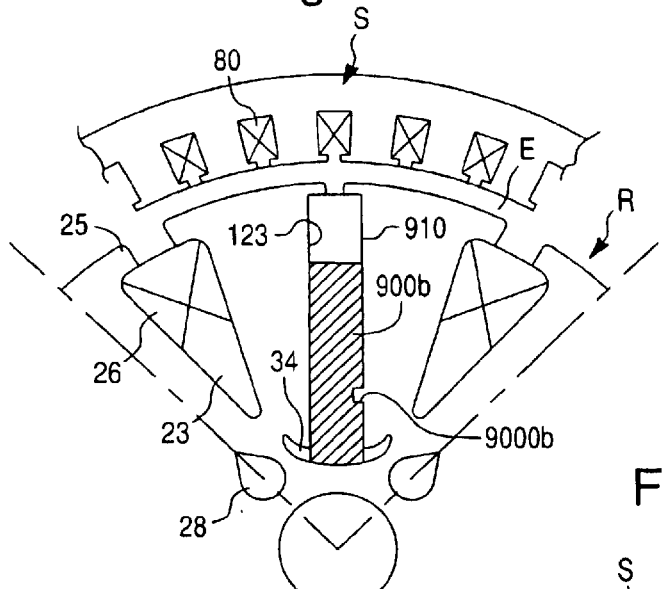
Figure 7:
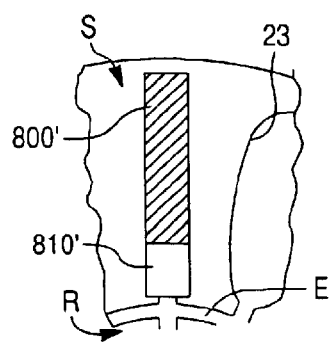
FIG. 7 is a partial view showing the fitting of magnets in a stator.

With reference to FIGS. 6a and 6b, these show two further embodiments of magnets to be used in a rotary electrical machine similar to that in FIG. 5, in which magnets of different compositions having the same thickness can be used. It is then advantageous to provide indexing means on one of the two magnets, for example on the ferrite magnet, so that the magnets in the two groups are not reversed.

FIG. 6a accordingly shows a ferrite magnet 900a in superimposed relationship with a magnet 910 containing rare earths, the ferrite magnet having its end close to the axis of rotation at least partly chamfered (with a chamfer 9000a). In that case, the forms of the laminations of the rotor are adapted so that they are complementary to the geometry of the magnet 900a.

FIG. 6b shows a second version, the indexing means here consisting of a notch 9000b, with a projecting element (not shown) penetrating in a complementary manner into the notch.

It is clearly possible to provide any other indexing means within the competence of the person skilled in the art, on one or other of the magnets, in order to prevent reversal of the magnets while they are being introduced into the slots in the rotor.

It will therefore be apparent that a judicious combination of magnets of different compositions in a rotary machine does, in accordance with the invention, enable overall size to be reduced as compared with a machine which only makes use of ferrite magnets, and at the same time enables the selling price of the machine to be substantially reduced as compared with a machine which only has magnets that contain rare earths.

As already stated, although the examples described above have magnets only in the rotor, it is also possible in accordance with the invention to include such combinations in the stator of the machine. Thus, in that case (FIG. 7), the rare earth magnets 810', which are the smaller ones, are fitted close to the airgap E and to the rotor, while the ferrite magnets 800' are buried in the stator.

The invention is applicable with particular advantage in the field of alternators and motors having magnets, especially in the automotive field.

In FIGS. 4a to 6b the permanent magnets are disposed radially in such a way that their magnetisation is orthoradial, that is to say at right angles to a radius.

In FIG. 5, the combinations of ferrite magnet 800 and rare earth magnet 810 are distributed with alternate polarities over the perimeter of the rotor, the fluxes generated by two successive combinations of permanent magnets having opposite components in the direction of displacement of the rotor. For more detail, reference should be made to the document FR 99 02345 mentioned above, filed on 25 Feb. 1999.

Thus, the combinations of superimposed permanent magnets 800, 810 are arranged alternately with pairs of bundles of excitation windings 26 received in slots 23 separated by projecting poles 25.

The combinations of magnets 800, 810 are also received in housings in the form of slots 123, which are stepped radially for mounting a rare earth permanent magnet shallower and narrower than the ferrite magnet, that is to say smaller than the ferrite magnets as in FIGS. 6a and 6b.

As indicated in the document FR 99 02345 mentioned above, a polarity NNN-SSS etc. changes, in the absence of excitation, to a polarity N-S, N-S etc. when the windings 26 of the rotor are excited. As described in the same document, holes 28 are formed close to the rotor shaft, and are distributed between the combinations of permanent magnets. The holes define non-magnetic zones with throttling surfaces which limit the magnetic fluxes towards the shaft A.

Each of the housings 123 for the permanent magnets terminates internally in a widened aperture 34 of generally curved form, which is curved backwards at 34a on either side of the magnets 800 so as to optimise the field lines. All of this enables mechanical strength against centrifugal force to be optimised, having regard to the fact that the rare earth magnets are retained in FIGS. 5 to 6b radially towards the outside by the projecting poles 25 and on the inside by the ferrite magnets.

In FIG. 4c, the rare earth magnets are immobilised radially by the ferrite magnets 731, 732, the latter being wider, and the slots being stepped in consequence. The ferrite magnets 731, 732 in this example are magnetised orthoradially and therefore generate orthoradial magnetic fluxes.

As will have been understood, because magnetisation is orthoradial (at right angles to a radius), concentration of the magnetic fluxes reduces the volume of the rare earth magnets much more, and in particular much more than in the configuration in which both types of magnets are surface mounted. In addition, the ferrite magnets are more efficient due to the concentration of the magnetic fluxes in the arrangements described than in a surface mounted configuration.

The magnetic flux can be homogenised at the level of the airgap between the stator and rotor, by adjusting, firstly the ferrite magnets and rare earth magnets, mainly in terms of depth, and secondly, the circumferential distance between the slots 23 and the ferrite magnets, and the flux set up by the ferrite magnets can be equal to that which is developed by the rare earth magnets.

In another version, the arrangements in FIGS. 4b and 4c can be applied to the magnets in FIG. 3 in which the magnets are all oriented clockwise.

What is claimed is:

1. A rotary electrical machine, comprising a stator (S), a rotor (R), an airgap (E) between the stator (S) and the rotor (R), and permanent magnets incorporated in at least one of the rotor and the stator, wherein the magnets constitute at least a first group of magnets containing rare earths and a second group consisting of ferrite magnets, wherein a plurality of sub-assemblies (720, 721–731, 730, 732–800, 810 . . . ) is provided, each sub-assembly combining at least one magnet of the first group with a magnet of the second group arranged in superimposed relationship in a generally radial direction and wherein, at least one of said magnets being disposed radially so as to generate an orthoradial magnetic flux, wherein a plurality of sub-assemblies of magnets (720–721, 730–732, 800–810) are provided inside the rotor, each sub-assembly combining at least one magnet of the first group with at least one magnet of the second group, at least one of the said magnets being oriented radially so as to generate an orthoradial magnetic flux, wherein each sub-assembly comprises a magnet containing rare earths (721, 810) situated closer to the airgap (E) than the ferrite magnet, said magnet containing rare earth (721, 820) arranged in superimposed relationship in a generally radial direction with a ferrite magnet (720, 800).

2. An electrical machine according to claim 1, wherein both said magnets are disposed radially so as to generate a substantially orthoradial magnetic flux.

3. An electrical machine according to claim 1, wherein said magnet of the second group is located radially to generate an orthoradial magnetic flux, while at least one magnet of the first group is inclined with respect to the radial direction.

4. A rotary electrical machine, comprising a stator (S), a rotor (R), an airgap (E) between the stator (S) and the rotor (R), and permanent magnets incorporated in at least one of the rotor and the stator, wherein the magnets constitute at least a first group of magnets containing rare earths and a second group consisting of ferrite magnets, wherein a plurality of sub-assemblies (720, 721–731, 730, 732–800, 810 . . . ) is provided inside the rotor, each sub-assembly combining at least one magnet of the first group with at least one magnet of the second group, at least one of the said magnets being oriented radially so as to generate an orthoradial magnetic flux, and wherein each sub-assembly comprises a magnet containing rare earths (730) interposed, in a radial direction, between two ferrite magnets (731, 732).

5. An electrical machine according to claim 4, wherein each sub-assembly comprises a magnet containing rare earths (910) situated close to the airgap (E) and in superimposed relationship in a generally radial direction with a ferrite magnet (900a, 900b) of the same thickness as the rare earth magnet, the said ferrite magnet including indexing means defined by at least one of a chamfered portion (9000a) and a notch (9000b).

6. An electrical machine according to claim 5, wherein the first group consisting of rare earth magnets is of smaller size than the second group consisting of ferrite magnets.

7. An electrical machine according to claim 6, wherein the sub-assemblies are mounted in the rotor (R).

8. An electrical machine according to claim 7, wherein each sub-assembly consists of a magnet of the first group (721, 810 . . . ) situated close to the surface of the rotor (R) and arranged in superimposed relationship in a generally radial direction with a ferrite magnet (720, 800) situated close to the axis of rotation of the rotor.

9. A rotary electrical machine, comprising a stator (S), a rotor (R), an airgap (E) between the stator (S) and the rotor (R), and permanent magnets incorporated in at least one of the rotor and the stator, wherein the magnets constitute at least a first group of magnets containing rare earths and a second group consisting of ferrite magnets, wherein a plurality of sub-assemblies (720, 721–731, 730, 732–800, 810 . . . ) is provided inside the rotor, each sub-assembly combining at least one magnet of the first group with at least one magnet of the second group, at least one of the said magnets being oriented radially so as to generate an ortho-radial magnetic flux, wherein each sub-assembly comprises a magnet containing rare earths (721, 810) situated close to the airgap (E), arranged in superimposed relationship in a generally radial direction with a ferrite magnet (720, 800), and wherein each sub-assembly comprises a magnet containing rare earths (910) situated close to the airgap (E) and in superimposed relationship in a generally radial direction with a ferrite magnet (900a, 900b) of the same thickness as the rare earth magnet, the said ferrite magnet including indexing means defined by at least one of a chamfered portion (9000a) and a notch (9000b).

10. An electrical machine according to claim 9, wherein the first group consisting of rare earth magnets is of smaller size than the second group consisting of ferrite magnets.

11. An electrical machine according to claim 10, wherein the sub-assemblies are mounted in the rotor (R).

12. An electrical machine according to claim 11, wherein each sub-assembly consists of a magnet of the first group (721, 810 . . . ) situated close to the surface of the rotor (R) and arranged in superimposed relationship in a generally radial direction with a ferrite magnet (720, 800) situated close to the axis of rotation of the rotor.

* * * * *